United States Patent [19]
Olson

[11] 3,815,933
[45] June 11, 1974

[54] UTILITY CART
[76] Inventor: Victor F. Olson, 6158 Ella Lee Ln., Houston, Tex. 77027
[22] Filed: Mar. 26, 1973
[21] Appl. No.: 344,496

[52] U.S. Cl................. 280/47.35, 248/98, 280/79.3
[51] Int. Cl.............................................. B62b 3/04
[58] Field of Search .......... 280/47.35, 79.3; 248/98

[56] References Cited
UNITED STATES PATENTS
1,762,475  6/1930  Hirsch............................... 248/98 X
3,162,462  12/1964  Elders.............................. 280/47.35

*Primary Examiner*—David Schonberg
*Assistant Examiner*—Michael J. Forman

[57] ABSTRACT

A utility cart includes a generally rectangular shaped base member having a bottom with front, back and two sides extending upwardly therefrom. First vertically extending members are secured to the two sides in opposed relation at approximately the midpoint thereof with second vertically extending members secured to the sides in spaced relation to the first vertically extending members and extend upwardly in parallel relation thereto adjacent the corners of said base member. Third vertically extending members are secured to the back side of the base member and extend upwardly and parallel between the second vertically extending member. A generally rectangular shaped top member is secured to and extends between the third and second vertically extending member and is also secured to the first vertically extending member and extends forwardly therefrom to overlie the base member of the utility cart. Bag means having an open end and a closed bottom is positioned on the cart with the bottom of the bag resting on the base member and the open upper end of the bag being adjacent the top member and engaged therewith by resilient band means. The top member, first vertically extending members and the base member form an opening at the front and sides of the cart which is generally U-shaped so that the bag upon disengagement with the top member may be removed from the front of the cart.

4 Claims, 4 Drawing Figures

UTILITY CART

SUMMARY OF THE INVENTION

The prior art with which applicant is familiar comprises the following patents: Mills, U.S. Pat. No. 2,831,698; Scudder, Des. 115,352; Webber, U.S. Pat. No. 2,596,749; Wilson, U.S. Pat. No. 2,865,647; Huffman, et al, U.S. Pat No. 3,052,484; Elders, U.S. Pat. No. 3,162,462; Enders U.S. Pat. No. 2,764,419.

None of the prior art with which applicant is familiar illustrates the specific utility cart construction of the present invention wherein a top and bottom overlie each other and are provided with first, second and third vertically extending members therebetween and are arranged to provide a top and bottom for receiving a bag so that the bottom of the bag may rest on the bottom of the utility cart and the open upper end of the bag may be secured to the upper or top end of the cart, and wherein the bag may be readily and easily removed from the cart from the front thereof.

Yet an further object of the present invention is to provide a utility cart of the type described which provides support for a bag on three sides thereof while permitting the bag to be readily withdrawn or removed from the cart when the bag is full without necessarily requiring that the bag be lifted up through the top of the cart.

Yet a further object of the present invention is to provide a utility cart of the type described which provides support for a bag on three sides thereof while permitting the bag to be readily withdrawn or removed from the cart when the bag is full without necessarily requiring that the bag be lifted up through the top of the cart, and which utility cart is constructed and arranged so that it maintains its balance when propelled over a surface to thereby inhibit turning over or tilting of the cart.

Other objects and advantages of the present invention become apparent from consideration of the following description and drawings.

DESCRIPTION OF THE PREFERRED EMBODIMENT

Figure 1:
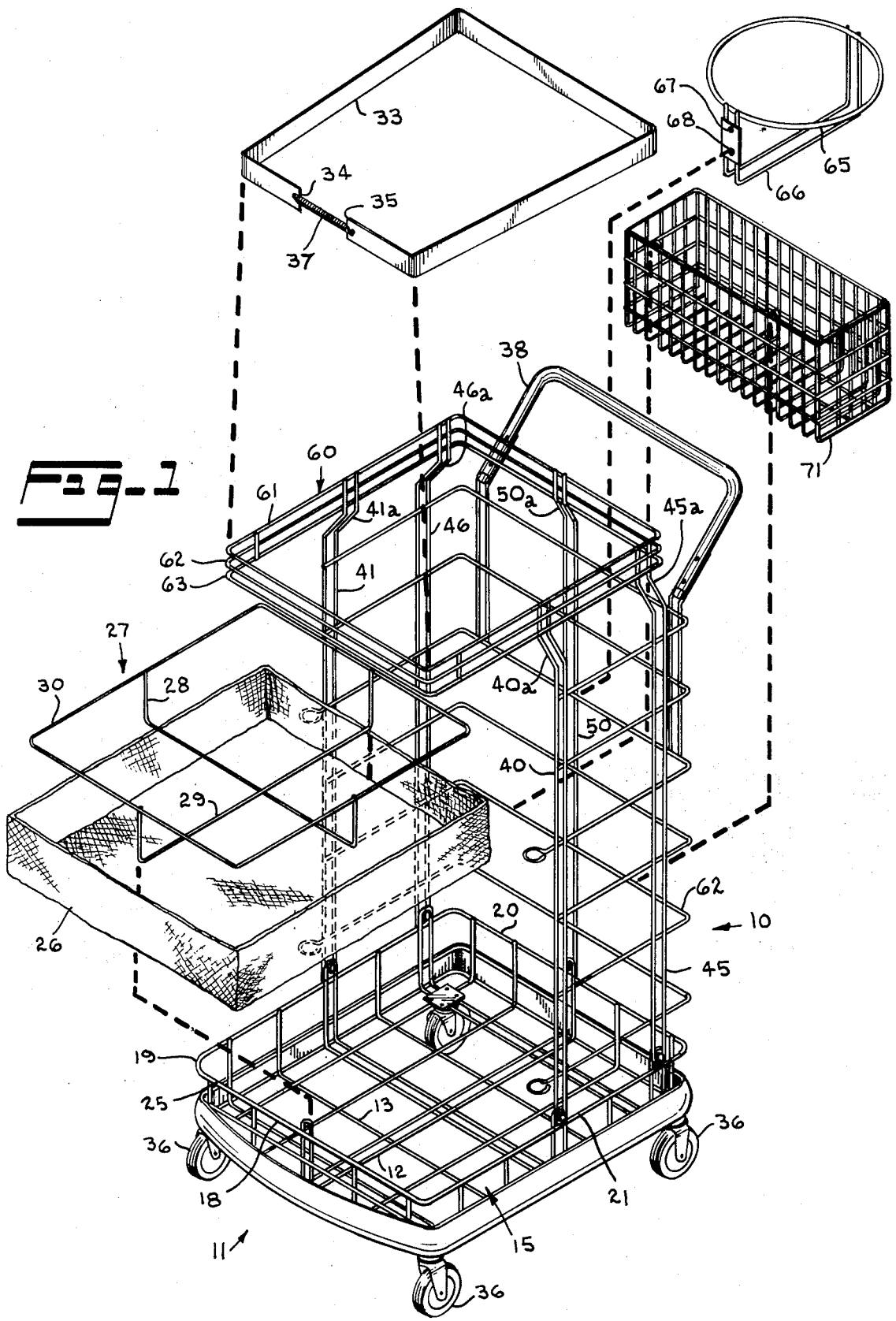
FIG. 1 is a perspective view, partially exploded illustrating the structural arrangement of the cart of the present invention.

Attention is first directed to FIG. 1 of the drawings wherein the present invention is referred to generally by the numeral 10.

The utility cart includes a generally rectangular shaped base member 11 having a bottom 15 and a front, back and two sides extending upwardly therefrom designated 18, 20, 19 and 21.

It will be noted that the base member is formed of a plurality of spaced rods 12 and 13 which extend relative to each other at substantially right angles and are secured together by any suitable means such as spot welding or thelike. The ends of the rods 12 and 13 are turned up to form the front end or side 18 and rear or back side 20 and the opposed sides 19 and 21 respectively as illustrated in the drawings. A member 25 extends about the top of the upturned ends and it will be noted that the sides 18, 19, 20 and 21 are of relatively short vertical extent in relation to the vertical height of the utility cart; however, such arrangement does provide a bottom for receiving a bag 31 as shown in FIG. 2 of the drawings and as will be described in greater detail hereinafter.

If desired, the bottom 11 may be provided with the removable liner 26 which is also rectangular in configuration, and such liner may be held in place by the holddown member referred to generally at 27 including the two members 28 and 29 which are also turned upwardly at their ends as illustrated and are secured together by any suitable means such as spot welding as well as the rectangular ring 30 extending about the upper ends thereof. Thus, when the liner 26 is positioned in the bottom 11 the holddown member 27 may then be set on top to hold such removable liner 26 in place.

Figure 2:
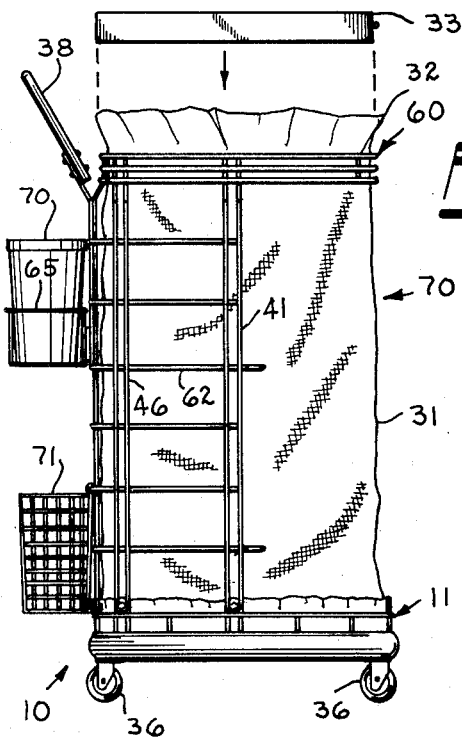
FIG. 2 is a side view of the cart of the present invention illustrating the bag positioned in the cart with the band means in position for engaging the top of the bag with the top member of the cart.

First vertically extending members 40 and 41 are secured to the sides 19 and 21 of the base member in opposed relation at substantially the midpoint of the sides 19 and 21 as shown in FIGS. 1 and 2 of the drawings. Second vertically extending members 45 and 46 are in spaced relation to the first members 40 and 41 and are secured to the base member 11 adjacent the juncture of the sides 19 and 21 with the rear or back side of the cart 20 as shown in FIGS. 1 and 2 of the drawings.

A third vertically extending member 50 is secured to the back side 20 of the base member 11 between the vertically extending members 45 and 46 as shown in FIG. 1 and extends upwardly therebetween in parallel spaced relation thereto.

A plurality of rods 62 are secured to the first, second and third vertically extending members and extend in a horizontal plane to provide structural strength and to form an enclosure for the bag 31 on three sides.

The first, second and third vertically extending members 40, 41, 45, 46, and 50 have their upper ends inwardly displaced as shown at 40a, 41a, 45a, 46a, and 50a and they terminate at their upper ends in a common horizontal plane as shown and a generally rectangular shaped top member 60 is formed by a plurality of spaced rods 61, 62 and 63 which extend in spaced horizontal planes and are secured to the second and third vertically extending member 45, 46 and 50 respectively by any suitable means such as spot welding as well as to the first vertically extending members 40 and 41 and extend forwardly from the first vertically extending members as illustrated in the drawings to overlie the base member 11.

Figure 3:
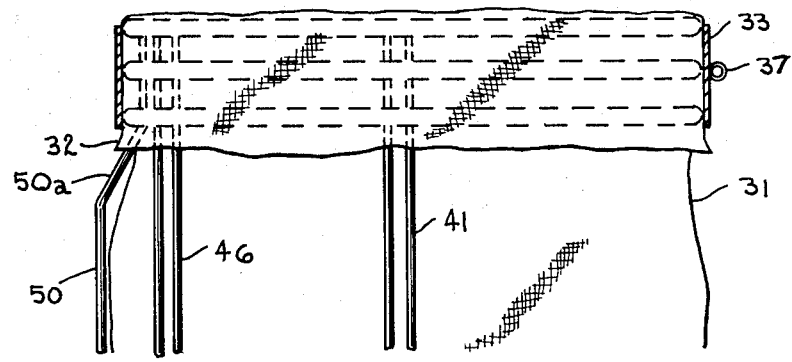
FIG. 3 is an enlarged partial view of the upper end of the utility cart illustrating the band means for removably positioning the bag on the utility cart.

It will be noted that the top member 60 is of somewhat smaller size and extent than the base member 11 by reason of the inwardly displaced end arrangement of the vertically extending members. The arrangement of the base member along with the first, second and third vertically extending members secured thereto and the top member 60 secured to the vertically extending members at their upper ends provides a structure which encloses a bag 31 on three sides and enables the bag means 31 to receive debris and other articles; however, such arrangement also provides a generally U-shaped opening 70 defined by the top member 60, the first vertically extending members 40 and 41 and the base member 11 as more clearly illustrated in FIGS. 2 and 3 of the drawings.

The bag means 31 may be of any suitable construction and material and includes a closed bottom and an open upper end. The open upper end 32 extends above the top member 60 and is then folded downwardly over the members 61, 62 and 63 whereupon the means 33 may be positioned about the top member 60 to removably hold the bag 31 in position. The means 33 for removably securing the bag 31 in position includes a continuous band shaped in a rectangle having its ends 34 and 35 in spaced relation with spring means 37 extending therebetween and secured to each of the ends 34 and 35 to thereby tend to reduce the size of the band 33. Thus, the band 33 may be expanded and positioned over the top member 60 and the spring means 36 will then tend to collapse it and retain the bag means in position on the utility cart during use of the cart.

The cart is provided with four wheels or casters 36 at each of the corners of the base member 11 which provides additional balance for the cart as it is propelled over a surface.

Suitable handle means 38 are secured adjacent the top of the cart, and an annular ring 65 with the U-shaped member 66 secured thereto and depending therefrom may be secured to the cart by positioning the openings 67 and 68 in engagement with projections on the third vertically extending member 50 or by suitable nut and bolt means extending therethrough and engaging members 50 or 62. The annular ring serve as a means for holding a pail 70 as illustrated in FIG. 2 of the drawings.

Similarly, the basket means 71 may be secured to the cart 10 by any suitable means such as the hooks thereon as shown in the drawing or by nuts and bolts or the like.

The relationship of the base member to the top member as well as the structural positioning of the first, second and third vertically extending members provides a utility cart which maintains the bag 31 in position during use and also provides a utility cart that is stable to inhibit tilting or turning over.

Figure 4:
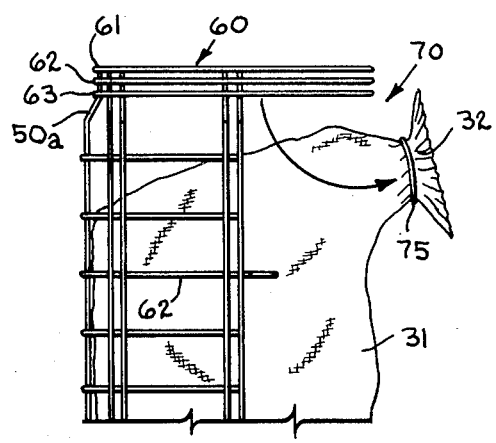
FIG. 4 is a side view illustrating the manner in which the bag may be removed from the cart when it is full.

Additionally, the generally U-shaped opening 70 defined by the cart, as previously described, enables the bag means 31 to be easily removed from such cart by disengaging the band 33 whereupon suitable closure means such as a tie band 75, FIG. 4, may be secured around the upper open end 32 of the bag 31 and the bag withdrawn through such generally U-shaped opening 70 at the forward end of the cart as illustrated in FIG. 4 of the drawings.

This eliminates the necessity of attempting to lift a full bag out of the top of the cart while retaining the bag firmly in position during use while permitting its easy removal after it has become full.

Thereafter another bag 31 may be positioned on the cart for receiving additional material therein. It can also be appreciated that the liner 26 can be replaced as and when necessary.

The foregoing disclosure and description of the invention are illustrative and explanatory thereof, and various changes in the size, shape, and materials as well as in the details of the illustrated construction may be made without departing from the spirit of the invention.

What is claimed is
1. A utility cart of the class described comprising:
   a. a generally rectangular shaped base member;
   b. said base member having a bottom;
   c. said base member being formed of spaced rods extending in a horizontal plane at substantially right angles to form the bottom, said rods being turned up at their ends;
   d. rod means secured to said upturned ends to form a front, back and two sides on said base of relatively short vertical extent in relation to the vertical height of the cart;
   e. first vertically extending members secured to said two sides in opposed relation at approximately the midpoints of said two sides;
   f. second vertically extending members secured to said two sides adjacent two corners of said rectangularly shaped base member and extending upwardly in parallel, spaced relationship to said first vertically extending members;
   g. third vertically extending members secured to said back side between said second vertically extending members and extending upwardly in parallel, spaced relationship to said second vertically extending members;
   h. said first, second and third vertically extending members having upper ends displaced inwardly of said vertically extending members and said upper ends terminating in a common horizontal plane;
   i. a generally rectangular shaped open top member secured to and extending between the upper, inwardly displaced ends of said third and second vertically extending members, and secured to and extending forwardly from the upper inwardly displaced ends of said first vertically extending members so that said top member overlies said base member and is of smaller size than said base member;
   j. bag means for positioning on the cart, said bag means having a bottom for resting on said base member and an open top;
   k. means for removably engaging said bag at its open top to said top member;
   l. said top member, first vertically extending members and said base member forming an opening at the front and sides of the cart which is generally U-shaped in configuration, whereby said bag, upon disengagement with said top member may be removed from the front of the cart through the generally U-shaped opening; and
   m. caster wheels adjacent each of the four corners of said base member to enable the cart to be moved along a surface.

2. The utility cart of claim 1 wherein said means for removably engaging said bag at its upper end comprises a generally rectangular band having ends in spaced relation and spring means extending between and connecting said ends together to thereby tend to reduce the size of said band so that it may be removably positioned on said bag and top member of the utility cart.

3. The utility cart of claim 2 including means for securing a basket to the rear of the cart between said base member and top member.

4. The utility cart of claim 3 including means secured to the rear of the cart to support a pail above said basket and below said top member.

* * * * *